Dec. 26, 1944.  C. L. THOMAS  2,365,917
ISOMERIZATION OF HYDROCARBONS
Filed Jan. 16, 1942
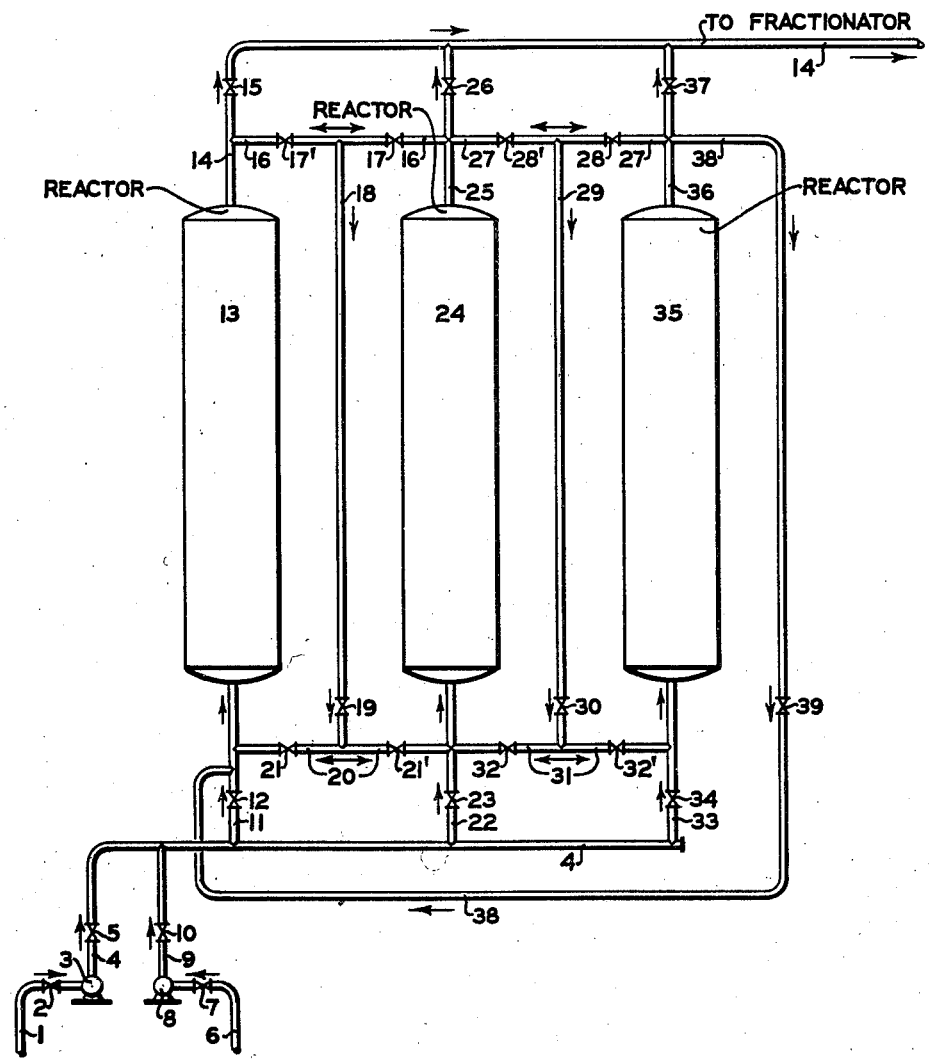
INVENTOR
CHARLES L. THOMAS
BY *Lee J. Gary*
ATTORNEY Patented Dec. 26, 1944

2,365,917

UNITED STATES PATENT OFFICE 2,365,917

ISOMERIZATION OF HYDROCARBONS

Charles L. Thomas, Chicago, Ill., assignor to Universal Oil Products Company, Chicago, Ill., a corporation of Delaware Application January 16, 1942, Serial No. 426,952

5 Claims. (Cl. 260—683.5)

This invention relates to processes in which saturated hydrocarbons such as paraffins or cyclo-paraffins are isomerized by metal halide-hydrogen halide catalysts.

The invention is more specifically concerned with improvements in continuous processes employing multiple beds of granular metal halide catalysts in rotation wherein spent catalyst sections are utilized as sources of the hydrogen halide necessary for promoting the activity of the metal halide catalyst in other reactors.

The isomerization of hydrocarbons of straight chain structure into their more highly branched counterparts has assumed increasing importance in the petroleum industry in late years. For example, normal butane which occurs in natural, refinery and cracked gases is not chemically reactive while isobutane is readily alkylatable by olefins in the presence of suitable catalysts to form normally liquid isoparaffins of high antiknock value which are utilizable as blending agents in anti-detonating motor fuels. It is generally recognized, furthermore, that the normally liquid straight chain paraffin hydrocarbons are lower in antiknock value than their isomers and gasoline and naphtha fractions which contain high percentages of branched paraffins are obviously more desirable as motor fuels and particularly as aviation fuels.

In isomerizing paraffin hydrocarbons to produce high antiknock branched chain derivatives numerous metal halide catalysts may be employed of the Friedel-Crafts type, these including primarily aluminum chloride and other halides of aluminum particularly the bromide and the halides and particularly chlorides of zinc, zirconium and iron. In most cases, the use of aluminum chloride is preferable on account of its high activity, relatively low cost and ready availability although aluminum bromide is generally more active. The other metal halides may be applicable by themselves in specific instances and they are frequently employable in admixture with aluminum chloride to modify and temper its action so that, when isomerizing hydrocarbons which tend to undergo decomposition reactions, the isomerization may be made more nearly the predominant reaction and decomposition losses minimized. When using any of these alternatively employable metal halides in isomerization greatest effectiveness is secured by using corresponding hydrogen halides in conjunction with them, the relative proportions of metal halide and hydrogen halide for producing optimum effects varying with the type of hydrocarbon treated and the degree of isomerization desired.

Commercial practice in isomerization favors the use of continuous processes in which a hydrocarbon or hydrocarbon mixture to be isomerized is passed through a bed of granular isomerization catalyst in admixture with a regulated amount of a hydrogen halide. The catalysts of the types mentioned may be employed in granular form as such or in more dispersed form on supporting materials. In continuous operations multiple beds of catalyst are interconnected so that they may be used in series or parallel operations as best suits the situation at hand. The catalysts gradually become spent due to the accumulation of carbonaceous and heavy hydrocarbon deposits and the development of metal halide-hydrocarbon complexes so that after a period of time the bed of catalysts which is the first in the series becomes relatively inactive for isomerization. This deterioration is greatest when hydrocarbon stocks are treated which contain aromatics or olefins or which tend to form such compounds as a result of decomposition reactions.

In one specific embodiment the present invention comprises a process for the isomerization of saturated and particularly paraffinic hydrocarbons which comprises subjecting said hydrocarbons in admixture with a hydrogen halide to contact with granular metal halide catalysts contained in a series of interconnected reactors, said hydrogen halide being generated by the action of a mineral acid such as sulphuric and phosphoric acid upon a portion of said metal halide catalyst substantially spent in respect to its isomerizing activity.

In order to bring out more clearly the features of the present invention the attached drawing is provided which shows diagrammatically the essential details of an isomerizing plant hookup in which the process of the present invention may be conducted.

Referring to the drawing a hydrocarbon such as normal butane or a hydrocarbon mixture such as, for example, a straight run gasoline or naphtha is introduced into the plant by way of line 1 containing valve 2 to a charging pump 3 which discharges into line 4 containing valve 5. For the sake of simplicity no inlet line is shown for the initial introduction of a hydrogen halide such as hydrogen chloride, the process being described beginning at the point where some spent metal halide catalysts such as aluminum chloride is available for the generation of the required hydrogen halide. Obviously, in starting a plant of the present character the necessary hydrogen halide will have to be supplied from an exterior source not shown in the drawing. In accordance with the flow as shown a mineral acid such as, for example, sulphuric or phosphoric acid in regulated proportions is introduced through line 6 containing valve 7 to a charging pump 8 which discharges through line 9 containing valve 10 into line 4 which is designated as a header from whence branch lines lead to catalyst reactors arranged in both series and parallel connection to permit any type of flow. The strength and amount of acid employed will vary, depending upon such factors as the rate of flow of the incoming hydrocarbons, the amount of reactive metal halide remaining in a bed of spent catalyst, the temperature of the bed, the amount of hydrogen chloride found optimum and other factors. The acid will react primarily with the metal halide remaining as such in the spent catalytic material but some reaction may ensue between the other halogen-containing compounds. The reaction obviously will result in the formation of metal salts of the mineral acids which salts will remain in place and be eventually discarded or recovered for other service as circumstances may dictate.

The drawing shows 3 reactors in both series and parallel connection to illustrate various typical modes of operation and in the further interest of simplicity flows are indicated as being upward through the reactors although down-flow may be practiced by suitable piping arrangements. In case primary reactor 13 contains spent catalyst available as a source of hydrogen halide the mixture of hydrocarbon charge and mineral acid will flow through line 11 containing valve 12 into reactor 13 with valves 21, 23, and 34 closed. When reactors 24 and 35 contain isomerizing catalysts and these towers are to be used in series the hydrocarbon and hydrogen halide from reactor 13 will pass through line 14 into line 16 and valve 17' open and valves 15 and 17 closed and flow through line 18 and valve 19 into line 20 with valve 21 closed, vave 32 in line 31 closed and valve 21' open so that the mixture of hydrogen halide and the charge flows upwardly into reactor 24 by way of line 22. The partially isomerized material from reactor 24 will then pass into line 25 with valve 26 closed and valve 17 in line 16 closed and passed by way of line 27 with valves 28' open and valve 28 cosed through line 29 and valve 30 into final reactor 35 by way of line 31 and line 33 with valve 32 closed and valve 32' open. The isomerized material from reactor 35 will then pass through line 36 with valve 28 in line 27 closed and valve 39 in line 38 closed, through valve 37 to header 14 and to a fractionator as indicated. The fractionating system will preferably include adequate means for separation of hydrogen halide materials lighter than the desired isomerizate, the desired isomerizate and heavier material, the hydrogen halide being recycled if desired to any point in the system.

In case reactors 24 and 35 are to be used in parallel arrangement to isomerize the hydrocarbon from reactor 13 the materials flowing in line 20 will be divided and one portion enters reactor 24 by way of line 22 and the remaining portion enters reactor 35 by way of line 33, the stream of reactants being divided by the manipulation of valves 32 and 32' with valves 30, 17, 28 and 28' closed. The effluent materials from reactors 24 and 35 will pass respectively through line 25 containing valve 26 and line 36 containing valve 37 with valve 39 closed as before, the compound effluents flowing through header 14 to the final fractionation step.

In case reactor 24 contains spent catalyst to be used as a source of hydrogen halide the entering charge and mineral acid will flow directly into the bottom of reactor 24 by way of line 22 and valve 23 with valves 12, 21', 32 and 34 closed. If the two reactors 13 and 35 then contain active catalyst and they are to be used in series, the charge and hydrogen chloride from reactor 24 may then pass by way of line 25 to line 27 with valves 17 and 28 closed and valve 28' open. The reactants will then flow through line 29 containing valve 30 into line 31 and with valve 32 closed and valve 32' open will flow through line 31 and line 33 into reactor 35. The partially isomerized material from reactor 35 will follow line 36 with valve 37 closed and through line 38 containing vave 39 into line 11 and thence to final reactor 13 where the isomerization may be substantially completed. The final exit material will then pass through valve 15 and header 14 and pass to fractionation as described.

In case reactors 13 and 35 are to be used in parallel arrangement following reactor 24, the charge and generated hydrogen halide will follow line 25 with valve 26 closed and be split so that a portion flows into line 16 through valve 17 with valve 17' closed and a portion will flow through line 27 through valve 28' with valve 28 closed. The first mentioned portion will then follow line 18 through valve 19 into line 20 with valve 21' closed and pass through valve 21 and line 11 into reactor 13 and thence to fractionation by way of header 14 and valve 15. The remaining portion of the charge from reactor 24 will then follow line 29 containing valve 30 to line 31 and will pass through vave 32' with valve 32 closed into line 33 and thence through reactor 35 after which it will pass through line 36 and valve 37 with valve 39 closed, to header 14 and fractionation.

From the foregoing description of the flow when either reactor 13 or reactor 24 contain spent catalyst and the remaining 2 reactors are used in series or parallel connection, it can be seen that similar description could show the flow when reactor 35 contains spent catalyst and reactors 13 and 24 contain active catalysts.

Temperatures and pressures employed in isomerization processes of the present character will vary over a considerabe range depending upon the type and activity of the metal halide catalysts, the type of flow, the construction of the plant and other factors. However, when isomerizing paraffin hydrocarbons, gasolines or naphthenes, temperatures may be employed from about room temperature to about 250° C. and pressures of from atmospheric to as high as 500 pounds per square inch. Hydrogen may also be employed in admixture with the hydrocarbons and hydrogen halide since this seems at times to prolong the life of the metal halide catalysts due possibly to the suppression of decomposition reactions. Rates of flow will also be varied over a considerable range.

The following data are introduced to illustrate the type of results obtainable in the operation of processes of the present character. The data, however, are merely illustrative and the scope of the invention should not be construed in exact accordance therewith.

It was found in the operation of a plant similar to that described in connection with the drawing comprising a series of reactors filled with a granular catalyst consisting of aluminum chloride on a granular alumina support that the reactivity of the beds of material was practically zero after about 1200 hours of use in isomerizing normal butane to produce isobutane. The temperatures used were of the order of 100° C. and a pressure of 150 pounds per square inch was employed to insure substantially liquid phase conditions in the reactors. As an example of the initial and final condition of a reactor, the following data are introduced in Table 1.

*Table 1*

| | |
|---|---|
| Initial conversion butane to isobutane percent__ | 70 |
| Original percent by weight of Cl in supported catalyst_____ | 14.1 |
| Hours of use_____ | 1284 |
| Final conversion_____percent__ | Less than 10 |
| Percent by weight of chlorine in supported catalyst_____ | 6.3 |

In employing such a bed of spent material as a source of aluminum chloride in accordance with the present process, a mixture of normal butane with ordinary concentrated sulphuric acid (93–96% $H_2SO_4$) is passed through a bed of spent catalyst, the mixture comprising about 10% by weight of the sulphuric acid and 90% by weight of normal butane. During the passage of the mixture through spent material an amount of hydrogen chloride is generated equal to about 10 moles per 100 moles of normal butane which is about the amount corresponding to optimum conversion of normal butane. This operation is continued until the amount of hydrogen chloride drops off sharply indicating that the spent material can no longer be used, after which it is removed from the reactor and replaced by fresh supported catalyst.

It is within the scope of the present invention to treat the spent halide catalyst with sulphuric and/or phosphoric acid outside the original reactor as well as inside the reactor. This is especially true where the solid halide catalyst is liquefied as it becomes spent and it is convenient to remove it as a liquid and treat it outside the reactor to generate the hydrogen halide.

I claim as my invention:

1. A process for isomerizing saturated hydrocarbons which comprises passing a stream of the saturated hydrocarbons at isomerizing conditions in contact with a body of metal halide catalyst of the Friedel-Crafts type in the presence of a hydrogen halide until the catalyst is substantially spent with respect to its isomerizing ability, thereafter combining regulated amounts of a non-volatile mineral acid with said stream of hydrocarbons and passing the mixture in contact with the body of spent catalyst to generate hydrogen halide, continuing the latter treatment until the metal halide is substantially consumed and, during the period of said hydrogen halide generation, passing the resultant streams of saturated hydrocarbons and hydrogen halide in contact with a second body of the metal halide catalyst of higher activity than the body of spent catalyst.

2. A process for isomerizing saturated hydrocarbons which comprises passing a stream of the saturated hydrocarbons at isomerizing conditions in contact with a body of aluminum chloride catalyst in the presence of hydrogen chloride until the aluminum chloride catalyst is substantially spent with respect to its isomerizing ability, thereafter combining regulated amounts of a non-volatile mineral acid with said stream of hydrocarbons and passing the mixture in contact with the body of spent catalyst to generate hydrogen chloride, continuing the latter treatment until the aluminum chloride is substantially consumed and, during the period of said hydrogen chloride generation, passing the resultant stream of saturated hydrocarbons and hydrogen chloride in contact with a second body of aluminum chloride catalyst of higher activity than the body of spent aluminum chloride.

3. The process of claim 2 further characterized in that said non-volatile mineral acid comprises sulfuric acid.

4. The process of claim 2 further characterized in that said non-volatile mineral acid comprises phosphoric acid.

5. A process for the conversion of hydrocarbons which comprises passing a stream of the hydrocarbons at conversion conditions in contact with a body of metal halide catalyst of the Friedel-Crafts type in the presence of a hydrogen halide until the catalyst has substantially lost its ability to promote further conversion, thereafter combining regulated amounts of a non-volatile mineral acid with said stream of hydrocarbons and passing the mixture in contact with the body of spent catalyst to generate hydrogen halide, continuing the latter treatment until the metal halide is substantially consumed and, during the period of said hydrogen halide generation, passing the resultant stream of hydrocarbons and hydrogen halide in contact with a second body of the metal halide catalyst of higher activity than the body of spent catalyst.

CHARLES L. THOMAS.